H. BLUMENBERG, Jr.
APPARATUS FOR RECOVERING POTASSIUM COMPOUNDS FROM CEMENT KILN GASES.
APPLICATION FILED MAR. 15, 1918.

1,297,639.

Patented Mar. 18, 1919.
2 SHEETS—SHEET 1.

Inventor:
Henry Blumenberg, Jr.
by Hazard & Miller
Att'ys.

H. BLUMENBERG, Jr.
APPARATUS FOR RECOVERING POTASSIUM COMPOUNDS FROM CEMENT KILN GASES.
APPLICATION FILED MAR. 15, 1918
1,297,639.   Patented Mar. 18, 1919.
2 SHEETS—SHEET 2.
Fig. 2.
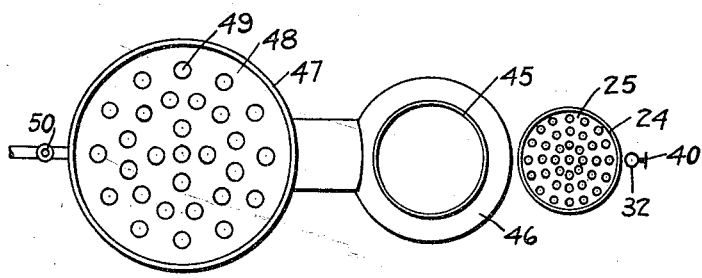
Fig. 3.
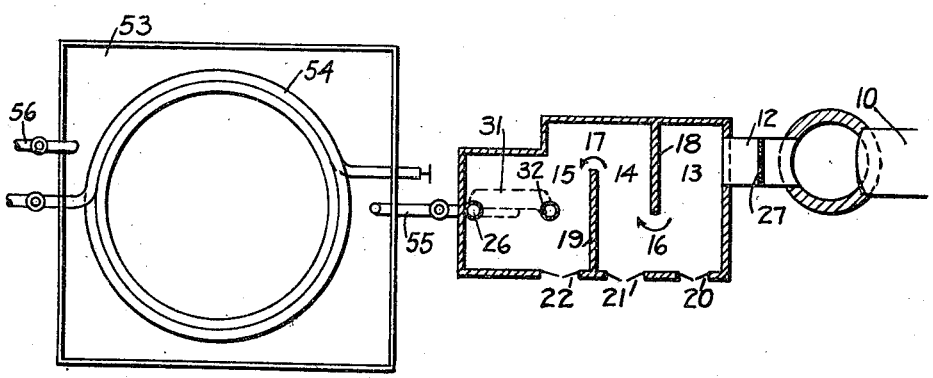
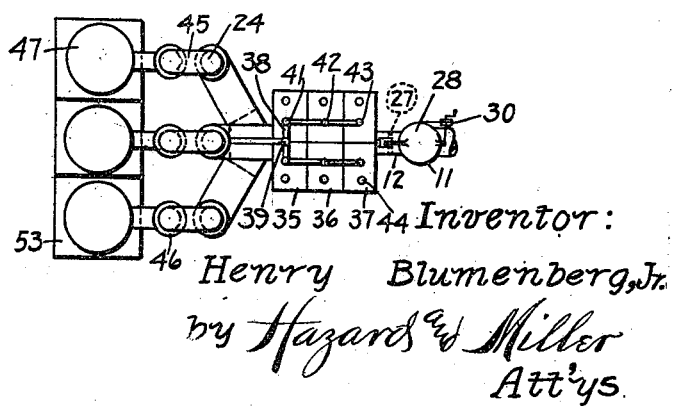
Fig. 4.
Inventor:
Henry Blumenberg, Jr.
by Hazard & Miller
Att'ys.

UNITED STATES PATENT OFFICE.

HENRY BLUMENBERG, JR., OF ORO GRANDE, CALIFORNIA.

APPARATUS FOR RECOVERING POTASSIUM COMPOUNDS FROM CEMENT-KILN GASES.

1,297,639.     Specification of Letters Patent.     Patented Mar. 18, 1919.

Application filed March 15, 1918. Serial No. 222,765.

*To all whom it may concern:*

Be it known that I, HENRY BLUMENBERG, Jr., a citizen of the United States, residing at Oro Grande, in the county of San Bernardino and State of California, have invented new and useful Improvements in Apparatus for Recovering Potassium Compounds from Cement-Kiln Gases, of which the following is a specification.

My invention relates to an apparatus for recovering potassium salts from waste gases, and in particular from waste gases of cement kilns.

The great demand for potassium salts has started new industries for the production of the same. One of the most successful is the production of potassium salts as a by-product in cement kilns. In some places, the potassium salts recovered have exceeded the value of the cement and the potassium salts have become the main product. The process in brief consists in using potassium bearing minerals, such as feldspar and the like as raw materials in the manufacture of cement. The potassium compounds of the mineral are volatilized and carried off with the waste gases from which they are recovered, while the main body of the mineral combines with the other materials to form cement.

The potassium compounds in the waste gases are only a small part of the solid constituents thereof, the larger portion consisting of cement dust or dust of the raw materials. It has been difficult to devise methods and apparatus for the inexpensive and complete recovery of the potassium compounds carried with the cement dust in the hot gases, and the present invention relates to an apparatus which is especially adapted for recovering the potassium compounds from such gases.

In my copending application, Serial No. 214212, filed January 28, 1918, for a process of recovering potassium salts and apparatus therefor, I have disclosed and claimed an apparatus for recovering potassium compounds from the gases of a cement kiln of which the present is an improvement. The apparatus described in said application recovers approximately 85% of the potassium compounds. The present improvements increase the efficiency of the apparatus, recovering practically all of it.

My invention consists in the apparatus hereinafter described and claimed.

In the accompanying drawings which form a part of this specification, I have illustrated an apparatus embodying my invention, and in which:

Fig. 2 is a horizontal section taken on line 2—2 of Fig. 1, through the precipitating tower and condenser.

Fig. 3 is a horizontal section on line 3—3 of Fig. 1.

Fig. 4 is a diagrammatic view in plan of my apparatus, using a plurality of precipitating towers and condensers.

Figure 1:
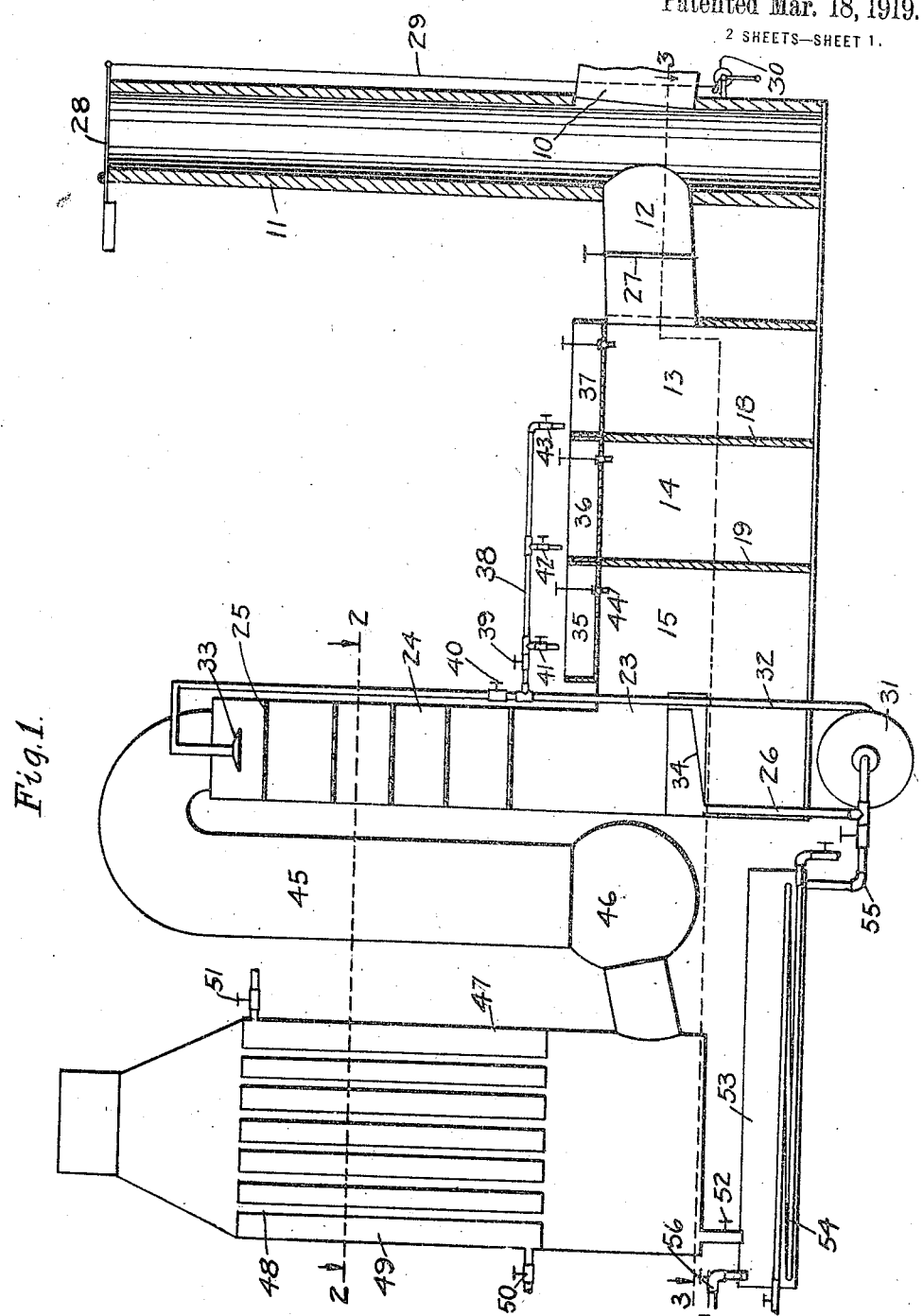
Figure 1 is a vertical section of my apparatus.

Referring to the drawings, 10 indicates the upper end of a rotary cement kiln which terminates in a main stack 11. A conduit 12 leads from the lower end of the stack 11 to a series of dust collecting chambers 13, 14 and 15, which may consist of any desired number. These chambers communicate with each other by means of passages 16 and 17, formed by vertical baffle walls 18 and 19 arranged in staggered relation, as shown in Fig. 3. 20, 21 and 22 are suitable doors in the side walls of the dust collecting chambers, whereby access may be gained thereto. A passage way 23 leads from the last chamber 15 into the lower end of the precipitating tower 24 which is shown here as cylindrical in type, but may be of any desired form. A series of perforated baffle plates 25 are horizontally mounted in the tower 24. 27 is a suitable valve in conduit 12. 28 is a lid or cover for the main stack 11 which is normally held closed by means of a cord 29 and windlass 30. If for any reason the apparatus for the recovery of the potash is not to be used, the conduit 12 is closed by means of valve 27 and the cover 28 is opened, allowing the cement gases to escape through the main stack 11.

31 is a centrifugal pump for circulating water by means of pipe 32 and spray nozzle 33 through the precipitating tower 24. The liquid collected in the inclined bottom 34 of the precipitating tower 24 is returned by means of pipe 26 to the pump 31. When the water has collected sufficient cement dust and potash so that resulting magma or slurry is handled with difficulty by the pump 31, the slurry is pumped into a series of evaporating pans 35, 36 and 37 by means of a branch pipe 38 leading from pipe 32 and which is provided with a valve 39. 40 is a valve in pipe 32 which is closed when valve 39 is opened to divert the slurry into said pans. 41, 42 and 43 are valved outlet pipes leading from the branch pipe 38 into evaporating pans 35, 36 and 37, respectively. Each pan is provided with a valved outlet 44 through which the slurry, after the desired degree of concentration has been reached, is allowed to flow into the dust collecting chambers 13, 14 and 15.

The gases after passing through the precipitating tower 24 are drawn through conduit 45 by means of a blower or fan 46 into the lower part of the condenser 47 where the rest of the potash and cement dust is recovered. The condenser 47 is provided with a central cooling portion consisting of a container 48 through which a series of spaced vertical pipes 49 open at both ends are arranged. The cooling water is admitted through the valved inlets 50. 51 is a valved outlet for the heated water. The gases coming from the precipitating tower 24 are considerably cooled and saturated with aqueous vapor and steam, which on passing through pipes 49 are condensed. During the condensation, the dust particles and potassium compounds, still carried by the gases after their passage through the precipitating tower 24 are collected in the bottom of the condenser 47 whence the same is run through a valved outlet pipe 52 into an evaporating pan 53 provided with a suitable steam coil 54. After the desired degree of concentration has been reached in the evaporating pan 53, the same may be led through a valved pipe 55 to the centrifugal pump 31 and pumped to the concentrating pans 35, 36 and 37 for further concentration. 56 is a valved water inlet pipe to the evaporating pan 53.

In the apparatus shown in Figs. 1 to 3 inclusive, only one precipitating tower and condenser are shown. In the modification shown in Fig. 4, a series of sets of dust collecting chambers, precipitating towers 24 and condensers 47 are shown, through which the gases are passed in series or in parallel, as desired. The use of a plurality of dust collecting chambers, precipitating towers and condensers will avoid the shut down of the apparatus in case any one of the apparatus mentioned should require repairing or cleaning. Furthermore, a more rapid and efficient recovery of the potash may be effected.

In the operation of the apparatus, the stack 11 is closed, the valve 27 in conduit 12 is opened and the gases passed through the dust collecting chambers 13, 14 and 15. In doing so they give off part of their heat to the pans 35, 36 and 37, concentrating the slurry therein. A part of the dust is collected in the chambers 13, 14 and 15. The gases passing through the precipitating tower come in contact with the water sprayed by nozzle 33 and approximately 85% of the dust will be collected and carried down to the bottom of the tower whence it will be circulated by means of pump 31 until the desired consistency of the slurry is obtained, when the valve 40 is closed and valve 39 in branch pipe 38 is opened and the slurry is pumped into the concentrating pans 35, 36 and 37. After further concentration, the slurry is allowed to flow to the bottom of the dust collecting chambers 13, 14 and 15 where it will come in contact with the hot dust collected therein and further evaporation and concentration will take place. The dried slurry as well as the dust in the chambers 13, 14 and 15 may be removed at suitable intervals through the doors 20, 21 and 22. The gases coming from the cement kiln have a temperature of about 1200° F.; the precipitating tower 24 reduces them in temperature down to 212° F., and saturates them with steam and vapor, which passing through the vertical pipes 49 in the condenser 47 will be condensed and in their condensation collect and precipitate the dust particles and the potassium compounds carried in said gases. The aqueous mixture of cement dust and potassium compounds will flow down the pipes to the bottom of the condenser whence the same may be run off into the evaporating pan 53 whence the same may be pumped through the pump 31 to the concentrating pans 35, 36 and 37 or used with the slurry in the circulation through the tower 24 until the desired concentration has been reached.

The slurry and cement dust collected from the dust collecting chambers 13, 14 and 15 is afterward treated in the usual manner to extract the potash or the same may be sold as a fertilizer without any further treatment, the potassium compound calculated as $K_2O$ ranging from four to eight per cent. depending upon the richness of the raw materials in potassium. The fertilizer, in addition to the potassium, contains more than fifty per cent. of calcium oxid which is another valuable ingredient in a fertilizer.

In some kilns which operate with dry raw materials, I prefer to use both precipitating towers and condensers. In cement kilns operating with wet slurry the precipitating towers may be dispensed with and the condenser alone be used, which is arranged immediately adjacent to the upper end of the cement kiln. The waste gases in cement kilns operating with wet slurry are of considerably lower temperatures than those of cement kilns operating with dry materials and they contain sufficient steam and aqueous vapor, which, on condensation in the vertical pipes 49 of the condenser, will precipitate the dust and potassium compounds.

The essential feature of this invention is the provision of a condenser with vertical pipes which are self cleaning. Condensers with horizontal pipes have been known, but the same soon become clogged with dust and precipitated matter that require frequent shut downs and cleanings, which in the present apparatus require no attention whatever.

I claim:

1. An apparatus for recovering potassium compounds from hot gases containing the same in suspension, comprising a dust precipitating chamber, a precipitating tower, means for circulating an aqueous mixture through said tower for precipitating the cement dust and potassium compounds, a condenser connected with said tower, vertical tubes open at both ends arranged in said condenser, means for circulating a cooling medium about said tubes, means for collecting the aqueous mixture of cement dust and potassium compounds precipitated in said condenser, and means for concentrating said aqueous mixture.

2. An apparatus for recovering potassium compounds from hot gases containing the same in suspension, comprising a series of dust collecting chambers having dividing walls provided with connecting passages in staggered relation, a precipitating chamber through which the gases after their passage to the dust collecting chambers are passed, means for circulating a precipitating fluid in said precipitating chamber, a condenser communicating with said precipitating chamber, vertical tubes open at both ends vertically arranged in said condenser, means for circulating a cooling medium about said tubes, and means for collecting the aqueous mixture of cement dust and potassium compounds precipitated in said condenser.

In testimony whereof I have signed my name to this specification.

HENRY BLUMENBERG, Jr.